United States Patent
Huang

(10) Patent No.: US 11,187,031 B2
(45) Date of Patent: Nov. 30, 2021

(54) FASTENING SYSTEM AND WINDOW SHADE INCLUDING THE SAME

(71) Applicant: Teh Yor Co., Ltd., New Taipei (TW)

(72) Inventor: Chien-Fong Huang, New Taipei (TW)

(73) Assignee: Teh Yor Co., Ltd., New Taipei (TW)

( * ) Notice: Subject to any disclaimer, the term of this patent is extended or adjusted under 35 U.S.C. 154(b) by 268 days.

(21) Appl. No.: 16/251,078

(22) Filed: Jan. 18, 2019

(65) Prior Publication Data

US 2019/0376338 A1   Dec. 12, 2019

Related U.S. Application Data

(60) Provisional application No. 62/682,268, filed on Jun. 8, 2018.

(51) Int. Cl.
*E06B 9/36* (2006.01)
*E06B 9/388* (2006.01)
(Continued)

(52) U.S. Cl.
CPC .............. *E06B 9/388* (2013.01); *E06B 9/262* (2013.01); *E06B 9/36* (2013.01); *E06B 9/386* (2013.01);
(Continued)

(58) Field of Classification Search
CPC . E06B 9/36; E06B 9/388; E06B 9/386; E06B 9/362; E06B 9/367; E06B 9/364;
(Continued)

(56) References Cited

U.S. PATENT DOCUMENTS

| 5,458,939 A | * | 10/1995 | Kitchen | .................. B29C 73/04 |
| | | | | 160/178.1 R |
| 6,050,322 A | * | 4/2000 | Finkelstein | .............. A47H 1/04 |
| | | | | 160/178.1 R |

(Continued)

FOREIGN PATENT DOCUMENTS

GB   2410176 A   7/2005

OTHER PUBLICATIONS

International Search Report and Written Opinion of the International Searching Authority dated Apr. 5, 2019 in connection with International patent application No. PCT/US2019/014099.

(Continued)

*Primary Examiner* — Jerry E Redman
*Assistant Examiner* — Jeremy C Ramsey
(74) *Attorney, Agent, or Firm* — Chen Yoshimura LLP

(57) ABSTRACT

A fastening system for a window shade includes a first and a second clipping base, and a first and a second clipping plate. In a first configuration, the first and second clipping bases are attached to each other with each of the first and second clipping plates respectively disposed between and in contact with the first and second clipping bases, whereby a first panel can be held between the first clipping base and the first and second clipping plates and a second panel can be held between the second clipping base and the first and second clipping plates. In a second configuration, the first and second clipping bases are attachable to each other without the first and second clipping plates, whereby a single panel of a window shade can be held between the first and clipping bases.

19 Claims, 17 Drawing Sheets

(51) Int. Cl.
    *E06B 9/262*         (2006.01)
    *E06B 9/386*         (2006.01)
    *F16B 15/00*        (2006.01)

(52) U.S. Cl.
    CPC .. *F16B 15/0023* (2013.01); *E06B 2009/2622* (2013.01); *F16B 2015/0069* (2013.01)

(58) Field of Classification Search
    CPC ......... E06B 9/365; E06B 9/262; A47H 13/01; A47H 13/06; A47H 13/14; A47H 13/00; A47H 23/04; A47H 23/05; A47H 23/06; Y10T 24/45105; Y10T 24/45152; Y10T 24/45225; Y10T 24/51
    USPC ........ 16/87.2, 93 D, 94 D, 95 D, 96 D, 87 R
    See application file for complete search history.

(56) References Cited

U.S. PATENT DOCUMENTS

| | | | | |
|---|---|---|---|---|
| 6,108,891 | A * | 8/2000 | Ruggles | ................. E06B 9/266 29/434 |
| 2008/0178423 | A1* | 7/2008 | Patel | ...................... A47H 13/14 16/87.2 |
| 2008/0236766 | A1* | 10/2008 | Vandervoort | ....... B29C 66/7485 160/172 V |
| 2017/0354285 | A1* | 12/2017 | Kim | ....................... A47H 13/02 |

OTHER PUBLICATIONS

Canadian Office Action and Search Report, dated Feb. 23, 2021 in a counterpart Canadian patent application, No. CA 3,070,489.
Australian Examination report, dated Jan. 10, 2020 in a counterpart Australian patent application, No. AU 2019200280.

* cited by examiner

US 11,187,031 B2

FASTENING SYSTEM AND WINDOW SHADE INCLUDING THE SAME

CROSS-REFERENCE TO RELATED APPLICATION(S)

This patent application claims priority to U.S. Provisional Patent Application No. 62/682,268 filed on Jun. 8, 2018, the disclosure of which is incorporated herein by reference.

BACKGROUND

1. Field of the Invention

The present invention relates to window shades including vertical panels, and fastening systems used in the window shades.

2. Description of the Related Art

Some existing window shades include a plurality of panels made of a fabric material that vertically hang from a head rail. The panels are conventionally attached to hangers, which are movably assembled with the head rail. The hangers can slide along the head rail and rotate so that the panels can be displaced horizontally or rotated to control an amount of light entering a room.

For attaching the panels to the hangers, fasteners are usually provided at the top of the panels. Each fastener may clip a panel and attach to one hanger, e.g., by having a hook of the hanger engaging a hole provided on the fastener. In practice, the conventional fasteners may have some disadvantages. For example, the fasteners may not suitably hold the panels, cause tearing of the panels, and/or do not provide a flexible use.

Therefore, there is a need for an improved fastening system that can be conveniently used in window shades and address at least the foregoing issues.

SUMMARY

The present application describes a fastening system for a window shade, and a window shade using the fastening system. The fastening system includes a first clipping base and a second clipping base, and a first and a second clipping plate respectively positionable between the first clipping base and the second clipping base. The fastening system has a first configuration where the first and second clipping bases are attached to each other with each of the first and second clipping plates respectively disposed between and in contact with the first and second clipping bases, and a second configuration where the first and second clipping bases are attached to each other without the first and second clipping plates between the first and second clipping bases, the fastening system in the first configuration being adapted to hold a first panel of a window shade between the first clipping base and the first and second clipping plates and to hold a second panel of a window shade between the second clipping base and the first and second clipping plates, and the fastening system in the second configuration being adapted to hold a single panel of a window shade between the first clipping base and the second clipping base.

Moreover, the present application provides a window shade including a first vertical panel, a second vertical panel, an outmost vertical panel and the fastening system, wherein the fastening system is suitable to either couple the first vertical panel adjacently to the second vertical panel or connect with an outer side portion of the outmost vertical panel. The first configuration of the fastening system is applied for coupling the first vertical panel adjacently to the second vertical panel with a top of the first vertical panel held between the first clipping base and the first and second clipping plates and a top of the second vertical panel held between the second clipping base and the first and second clipping plates, and the second configuration of the fastening system is applied for connecting with the outer side portion of the outmost vertical panel with a top of the outer side portion held between the first clipping base and the second clipping base.

DETAILED DESCRIPTION OF THE EMBODIMENTS

Figure 1:
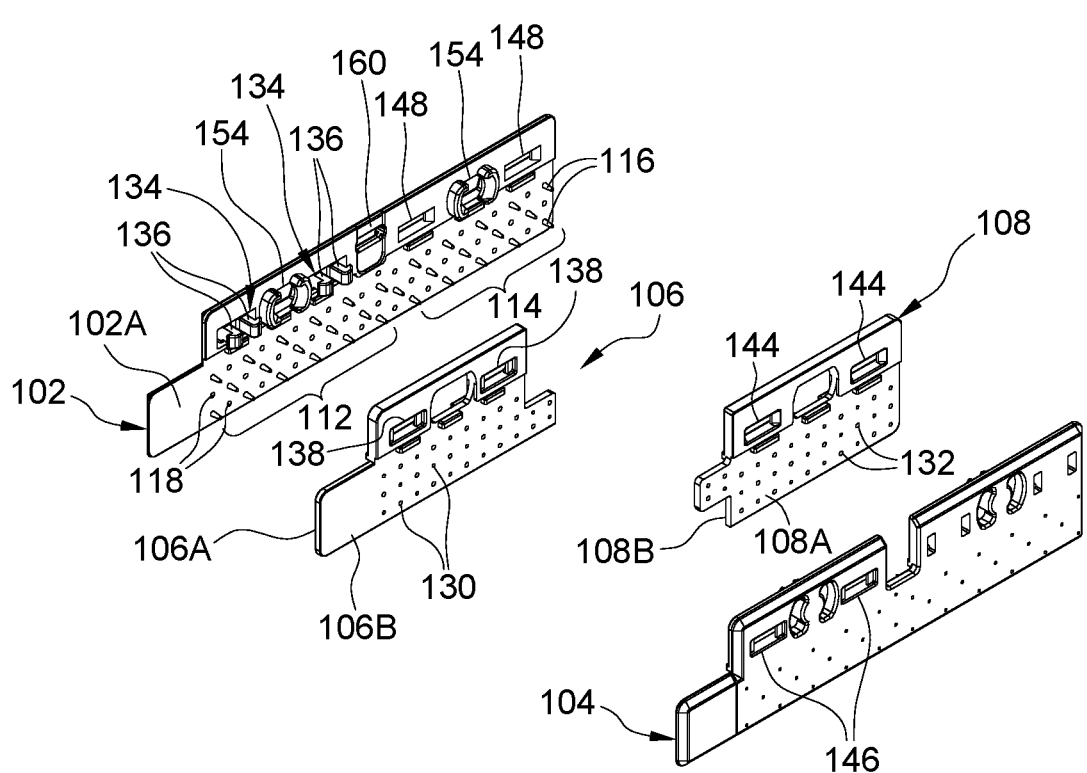
FIG. 1 is an exploded view illustrating an embodiment of a fastening system suitable for use with a window shade.

FIG. 1 is an exploded view illustrating an embodiment of a fastening system 100 suitable for use with a window shade. The fastening system 100 includes two clipping bases 102 and 104, and two clipping plates 106 and 108 positionable between the two clipping bases 102 and 104. Examples of suitable materials for the clipping bases 102 and 104 and the clipping plates 106 and 108 can include, without limitation, plastic materials. According to an example of construction, the two clipping bases 102 and 104 can have similar outer shape boundaries that can match each other when the clipping bases 102 and 104 are attached to each other. Each of the two clipping plates 106 and 108 can have a surface area that is respectively smaller than the surface area of the clipping base 102 and smaller than the surface area of the clipping base 104. When they are positioned between the two clipping bases 102 and 104, the two clipping plates 106 and 108 can be substantially covered by the clipping bases 102 and 104.

In the fastening system 100 described herein, the clipping plate 106 can be attached to the clipping base 102, the clipping plate 108 can be attached to the clipping base 104, and the two clipping bases 102 and 104 can be attached to each other with or without the two clipping plates 106 and 108 disposed between the two clipping bases 102 and 104. FIGS. 2-5 are various schematic views illustrating the construction and assembly of the clipping base 102 and the clipping plate 106 of the fastening system 100. FIGS. 6-9 are various schematic views illustrating the construction and assembly of the clipping base 104 and the clipping plate 108 of the fastening system 100. FIGS. 10-13 are various schematic views illustrating the assembly of the two clipping bases 102 and 104 with the two clipping plates 106 and 108 disposed between the two clipping bases 102 and 104. FIGS. 14-19 are various schematic views illustrating the construction and assembly of the two clipping bases 102 and 104 without the two clipping plates 106 and 108.

The fastening system 100 described herein has two configurations of use. In a first configuration, the two clipping bases 102 and 104 can be attached to each other with the two clipping plates 106 and 108 disposed between the two clipping bases 102 and 104, each of the two clipping plates 106 and 108 respectively contacting with the two clipping bases 102 and 104. According to an example of implementation, the two clipping plates 106 and 108 may be positioned contiguous to each other without overlap in the first configuration. The two clipping plates 106 and 108 may have a substantially equal thickness, so that each of the clipping plates 106 and 108 can oppositely contact with the two clipping bases 102 and 104 when the two clipping plates 106 and 108 are disposed contiguous to each other in the first configuration. In the first configuration, the fastening system 100 is adapted to hold two panels of a window shade adjacent to each other: a first panel can be held between the clipping base 102 and the two clipping plates 106 and 108, and a second panel can be held between the clipping base 104 and the two clipping plates 106 and 108. The first configuration of the fastening system 100 is better shown in FIGS. 10-13.

In a second configuration, the two clipping bases 102 and 104 can be attached to each other without the two clipping plates 106 and 108 between the two clipping bases 102 and 104. In the second configuration, the fastening system 100 is adapted to hold a single panel of a window shade between the two clipping bases 102 and 104. The second configuration of the fastening system 100 is better shown in FIGS. 14-19.

Figure 2:
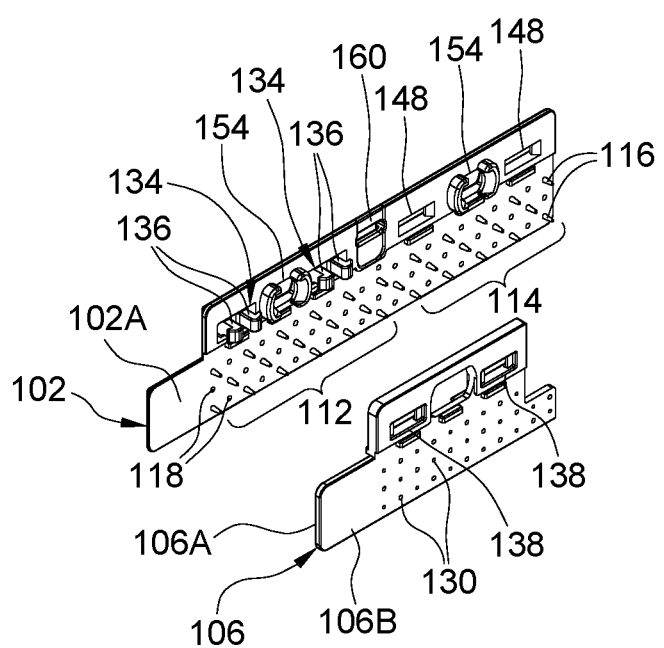
FIG. 2 is an exploded view illustrating a first clipping base and a first clipping plate of the fastening system.
Figure 3:
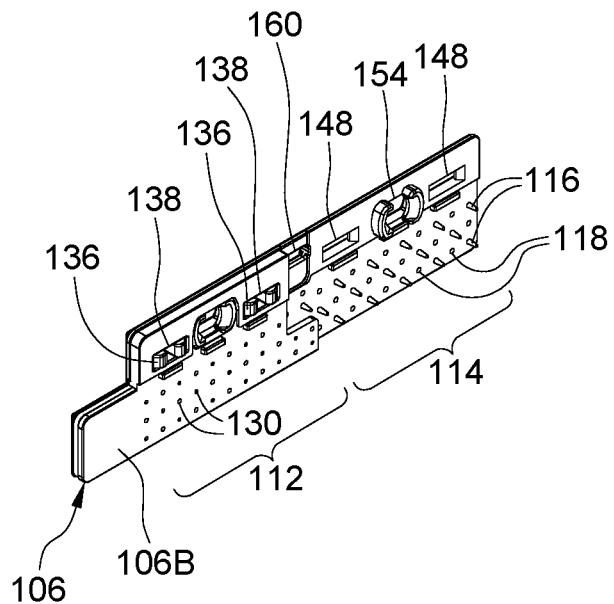
FIGS. 3 and 4 are two perspective views under different viewing angles illustrating the first clipping base and the first clipping plate attached to each other.
Figure 4:
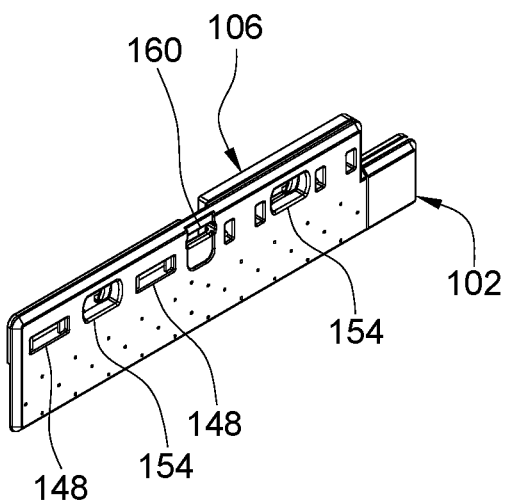
Figure 5:
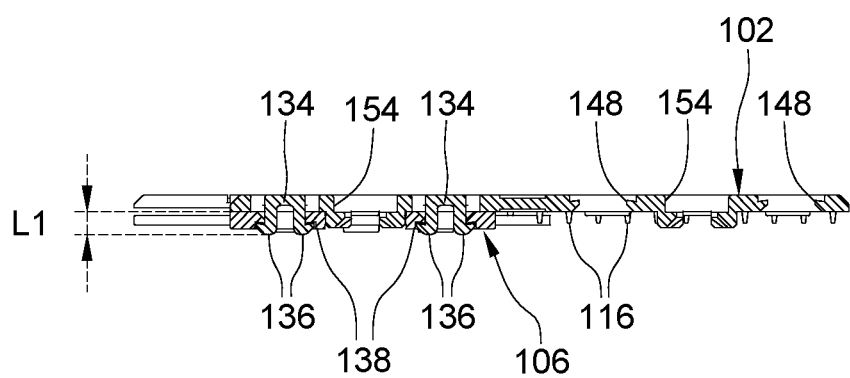
FIG. 5 is a cross-sectional view illustrating the first clipping base and the first clipping plate attached to each other.
Figure 6:
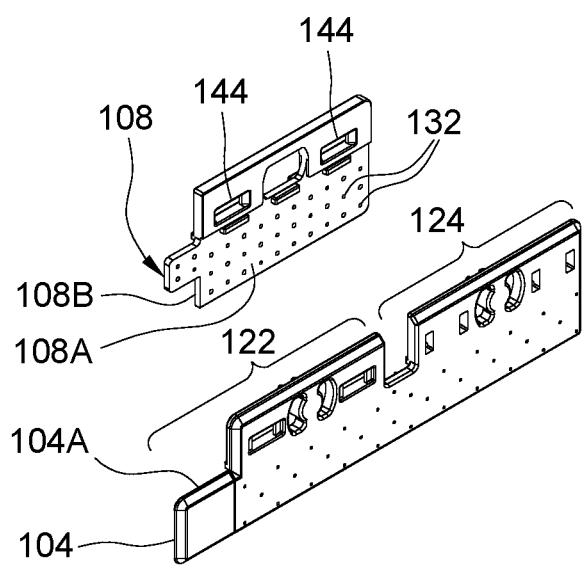
FIG. 6 is an exploded view illustrating a second clipping base and a second clipping plate of the fastening system.
Figure 7:
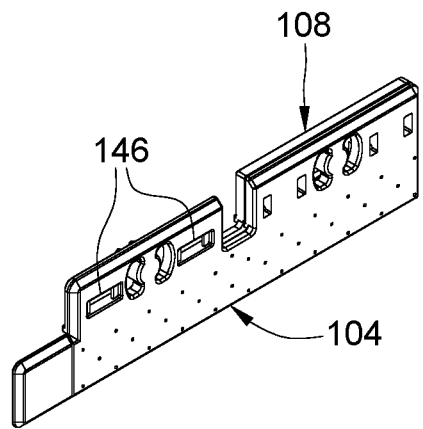
FIGS. 7 and 8 are two perspective views under different viewing angles illustrating the second clipping base and the second clipping plate attached to each other.

Referring to FIGS. 1-3, an inner surface 102A of the clipping base 102 oriented toward the clipping base 104 can have two base regions 112 and 114 adjacent to each other. Moreover, the clipping base 102 can include a plurality of teeth 116 adapted to pierce a panel of a window shade, and a plurality of holes 118. The teeth 116 and the holes 118 are distributed across the two base regions 112 and 114, the teeth 116 protruding from the two base regions 112 and 114 of the inner surface 102A. According to an example of construction, the clipping base 102 and the teeth 116 provided thereon may be formed as an integral part by plastic molding.

Referring to FIGS. 1 and 6-8, an inner surface 104A of the clipping base 104 oriented toward the clipping base 102 can have two base regions 122 and 124 adjacent to each other that can respectively correspond to the two base regions 112 and 114 of the clipping base 102. A plurality of teeth 126 adapted to pierce a panel of a window shade and a plurality of holes 128 are distributed across the two base regions 122 and 124 on the inner surface 104A of the clipping base 104, the teeth 126 protruding from the base regions 122 and 124. According to an example of construction, the clipping base 104 and the teeth 126 provided thereon may be formed as an integral part by plastic molding.

The holes 128 on the clipping base 104 are adapted to respectively receive at least partially the teeth 116 on the clipping base 102, and the distribution of the holes 128 in the two base regions 122 and 124 of the clipping base 104 can match with that of the teeth 116 in the two base regions 112 and 114 of the clipping base 102. Likewise, the holes 118 on the clipping base 102 are adapted to respectively receive at least partially the teeth 126 on the clipping base 104, and the distribution of the holes 118 in the two base regions 112 and 114 of the clipping base 102 can match with that of the teeth 126 in the two base regions 122 and 124 of the clipping base 104. The two base regions 112 and 114 of the clipping base 102 can respectively face the two base regions 122 and 124 of the clipping base 104 with the teeth 116 in misalignment with respect to the teeth 126 when the fastening system 100 is used in the first and second configurations.

Referring to FIGS. 1-3, the clipping plate 106 can include a plurality of holes 130 distributed on two opposite surfaces 106A and 106B of the clipping plate 106. According to an example of construction, each of the holes 130 may open on the two opposite surfaces 106A and 106B of the clipping plate 106. The distribution of the holes 130 on the clipping plate 106 can match with the distribution of the teeth 116 in the base region 112 of the clipping base 102 and the teeth 126 in the base region 122 of the clipping base 104. The holes 130 of the clipping plate 106 can receive at least partially the teeth 116 protruding from the base region 112 of the clipping base 102 and the teeth 126 protruding from the base region 122 of the clipping base 104, each hole 130 receiving only one of the teeth 116 and 126.

Referring to FIGS. 1 and 6-8, the clipping plate 108 can include a plurality of holes 132 distributed on two opposite surfaces 108A and 108B of the clipping plate 108. According to an example of construction, each of the holes 132 may open on the two opposite surfaces 108A and 108B of the clipping plate 108. The distribution of the holes 132 on the clipping plate 108 can match with the distribution of the teeth 126 in the base region 124 of the clipping base 104 and the teeth 116 in the base region 114 of the clipping base 102. The holes 132 of the clipping plate 108 can receive at least partially the teeth 126 protruding from the base region 124 of the clipping base 104 and the teeth 116 protruding from the base region 114 of the clipping base 102, each hole 132 receiving only one of the teeth 116 and 126.

Referring again to FIGS. 1-5, the clipping plate 106 and the clipping base 102 can be configured so that they are attachable to each other independently of the clipping plate 108 and the clipping base 104. For example, the clipping base 102 can include one or more latch 134 that can engage with the clipping plate 106 for attaching the clipping plate 106 to the clipping base 102. In the illustrated embodiment, two latches 134 are exemplary provided on the clipping base 102. It will be appreciated, however, that any number of the latches 134 may be provided for suitably attaching the clipping plate 106 to the clipping base 102.

The latches 134 may be exemplary disposed above the base region 112 of the clipping base 102. According to an example of construction, each latch 134 can include resilient hooks 136 that protrude from the side of the inner surface 102A of the clipping base 102. Each latch 134 can protrude from the side of the inner surface 102A of the clipping base 102 with a length L1, which can correspond to a length of the resilient hooks 136. According to an example of construction, the latches 134 can be formed integrally with the clipping base 102. According another example of construction, the latches 134 may be attached to the clipping base 102 via fasteners. The latches 134 can engage with the clipping plate 106 through respective openings 138 provided on the clipping plate 106. For example, the resilient hooks 136 of each latch 134 can engage with a boundary edge of the corresponding opening 138 for attaching the clipping plate 106 to the clipping base 102. The openings 138 can be provided above the surface region of the clipping plate 106 where the holes 130 are distributed.

Referring to FIGS. 1 and 6-9, the clipping plate 108 and the clipping base 104 can be likewise configured so that they are attachable to each other independently of the clipping plate 106 and the clipping base 102. For example, the clipping base 104 can include one or more latch 140 that can engage with the clipping plate 108 for attaching the clipping plate 108 to the clipping base 104. In the illustrated embodiment, two latches 140 are exemplary provided on the clipping base 104. It will be appreciated, however, that any number of the latches 140 may be provided for suitably attaching the clipping plate 108 to the clipping base 104.

The latches 140 may be exemplary disposed above the base region 124 of the clipping base 104. According to an example of construction, each latch 140 can include resilient hooks 142 that protrude from the side of the inner surface 104A of the clipping base 104. Each latch 140 can protrude from the side of the inner surface 104A of the clipping base 104 with a length L2, which can correspond to a length of the resilient hooks 142. According to an example of construction, the latches 140 can be formed integrally with the clipping base 104. According another example of construction, the latches 140 may be attached to the clipping base 104 via fasteners. The latches 134 and 140 can be similar in shape and dimensions. In particular, the length L1 of each latch 134 can be substantially equal to the length L2 of each latch 140. The latches 140 can engage with the clipping plate 108 through respective openings 144 provided on the clipping plate 108. For example, the resilient hooks 142 of each latch 140 can engage with a boundary edge of the corresponding opening 144 for attaching the clipping plate 108 to the clipping base 104. The openings 144 can be provided above the surface region of the clipping plate 108 where the holes 132 are distributed.

Referring to FIGS. 1 and 14-19, the latches 134 of the clipping base 102 can further engage with the clipping base 104 for attaching the clipping base 104 to the clipping base 102 without the two clipping plates 106 and 108 between the two clipping bases 102 and 104. For example, the clipping base 104 can include openings 146 for respective engagement of the latches 134. The openings 146 may be disposed above the base region 122 of the clipping base 104. The resilient hooks 136 of each latch 134 can exemplary engage with a boundary edge of the corresponding opening 146 for attaching the clipping base 104 to the clipping base 102. In addition or alternatively, the latches 140 of the clipping base 104 can also engage with the clipping base 102 when the clipping base 104 is attached to the clipping base 102 without the two clipping plates 106 and 108 between the two clipping bases 102 and 104. For example, the clipping base 102 can include openings 148 for respective engagement of the latches 140. The openings 148 may be disposed above the base region 114 of the clipping base 102. The resilient hooks 142 of each latch 140 can exemplary engage with a boundary edge of the corresponding opening 148 for attaching the clipping base 104 to the clipping base 102.

Figure 8:
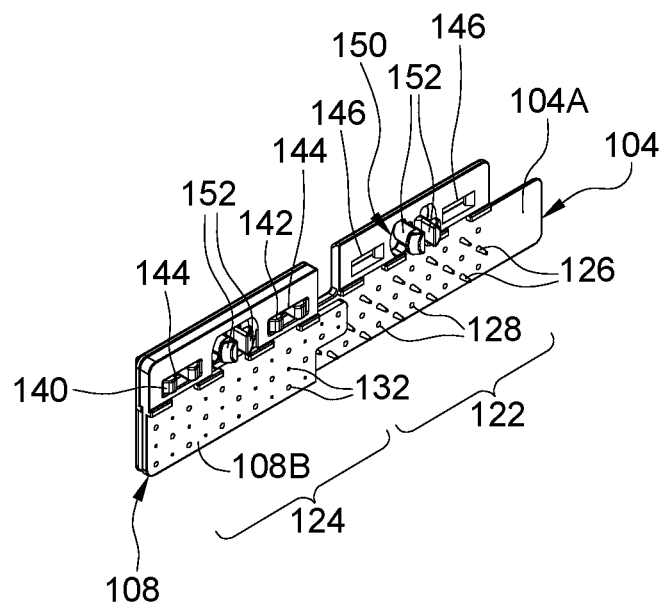
Figure 9:
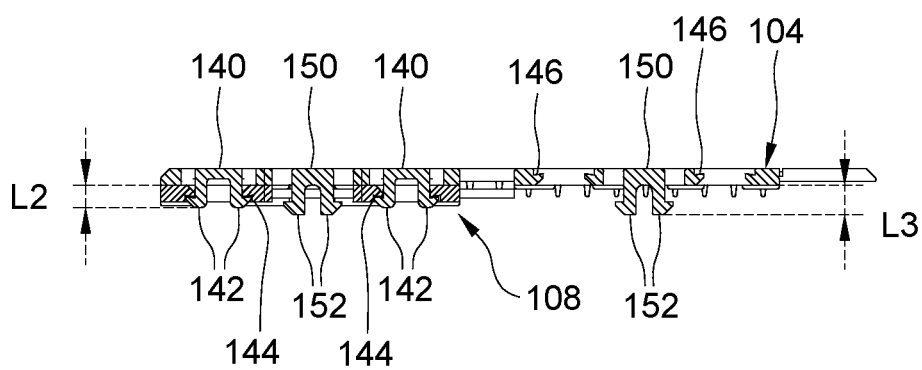
FIG. 9 is a cross-sectional view illustrating the second clipping base and the second clipping plate attached to each other.
Figure 10:
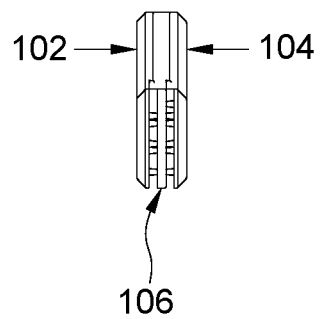
FIG. 10 is a side view illustrating the fastening system in a first configuration where the first and second clipping bases are attached to each other with the first and second clipping plates disposed between the first and second clipping bases.
Figure 11:
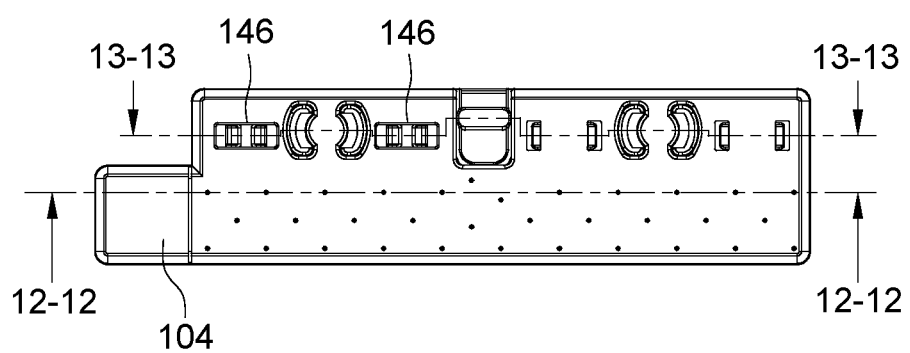
FIG. 11 is a front view illustrating the fastening system in the first configuration.
Figure 12:
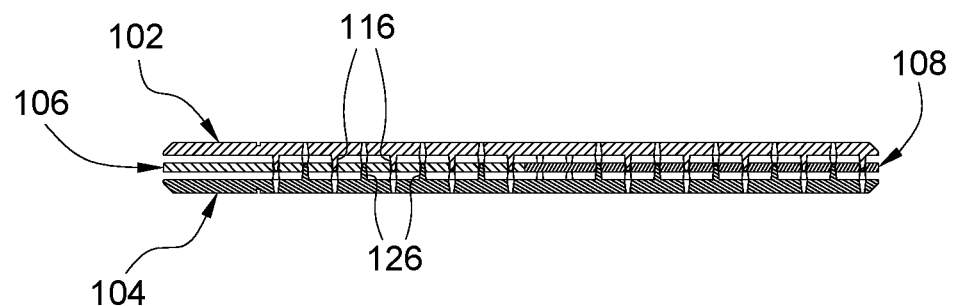
FIG. 12 is a cross-sectional view taken along section 12-12 shown in FIG. 11.
Figure 13:
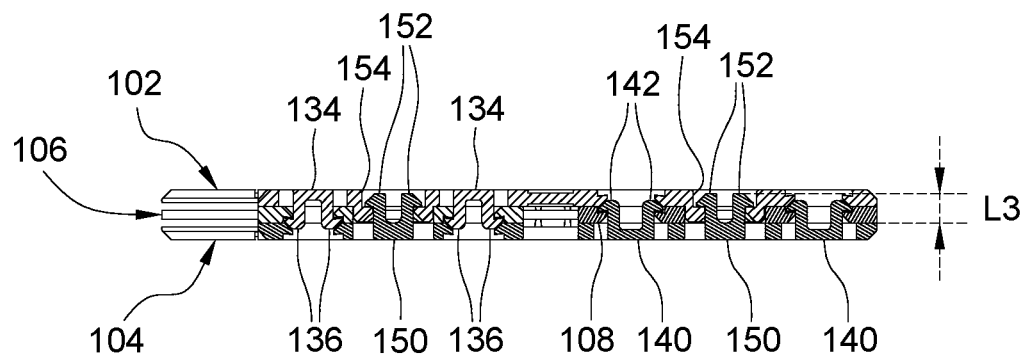
FIG. 13 is a cross-sectional view taken along section 13-13 shown in FIG. 11.
Figure 14:
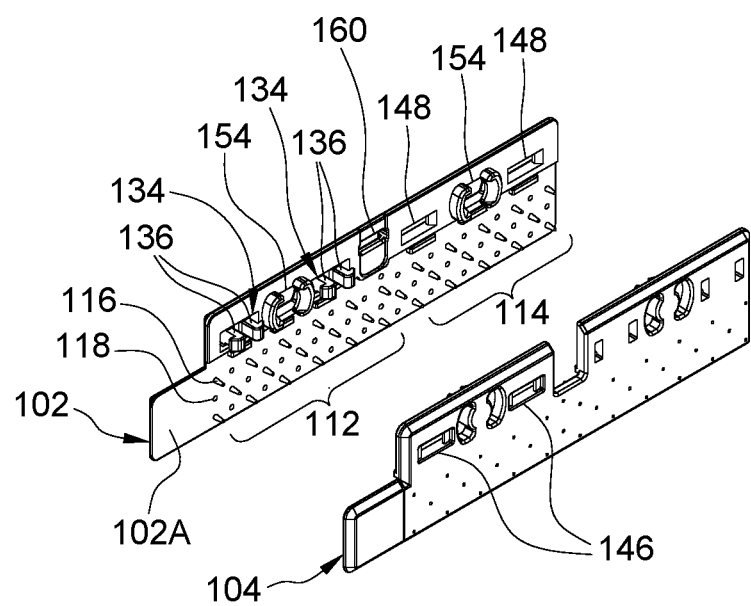
FIG. 14 is an exploded view illustrating the first and second clipping bases of the fastening system.
Figure 15:
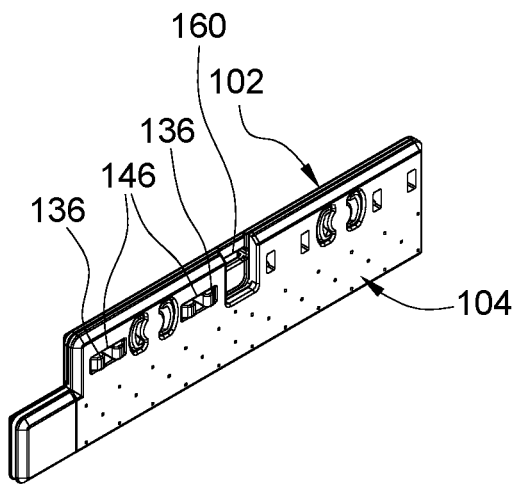
FIGS. 15 and 16 are two perspective views under different viewing angles illustrating the first and second clipping bases attached to each other without the first and second clipping plates in a second configuration of the fastening system.
Figure 16:
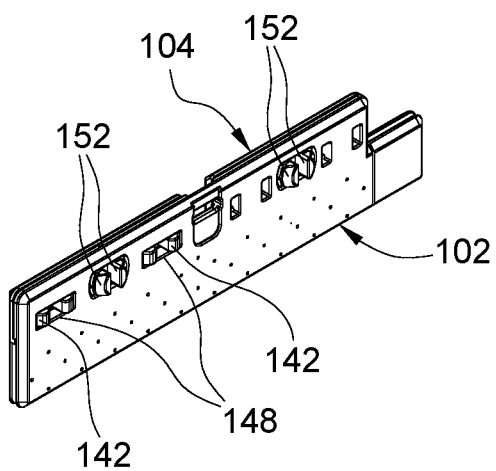
Figure 17:
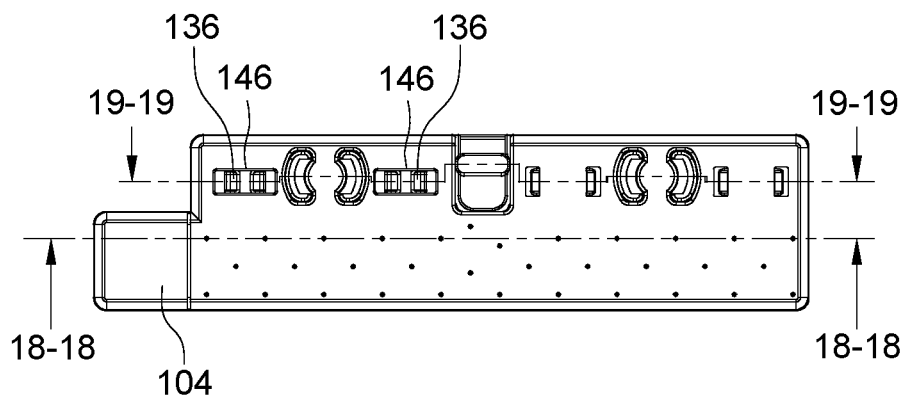
FIG. 17 is a front view illustrating the fastening system in the second configuration.
Figure 18:
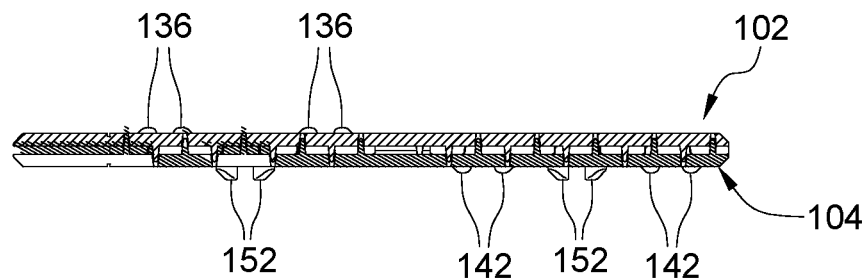
FIG. 18 is a cross-sectional view taken along section 18-18 shown in FIG. 17.
Figure 19:
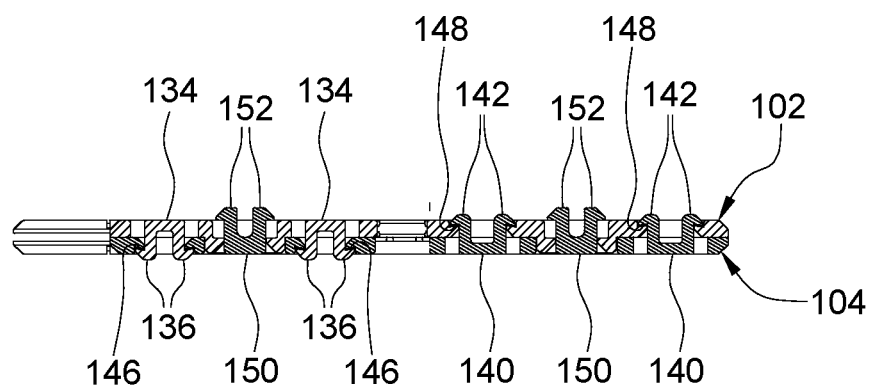
FIG. 19 is a cross-sectional view taken along section 19-19 shown in FIG. 17.
Figure 20:
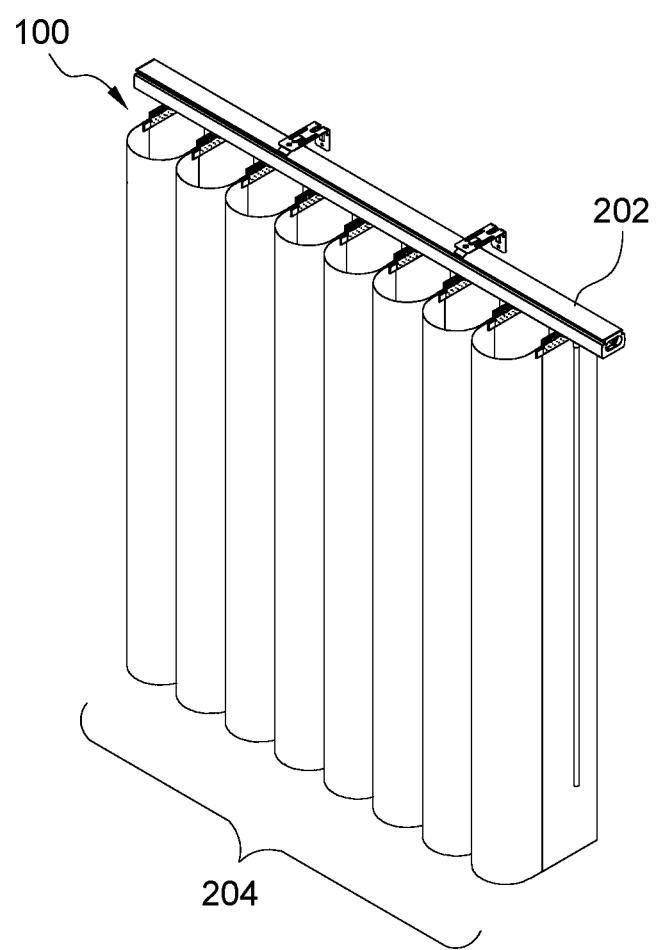
FIG. 20 is a perspective view illustrating an embodiment of a window shade including a plurality of vertical panels.
Figure 21:
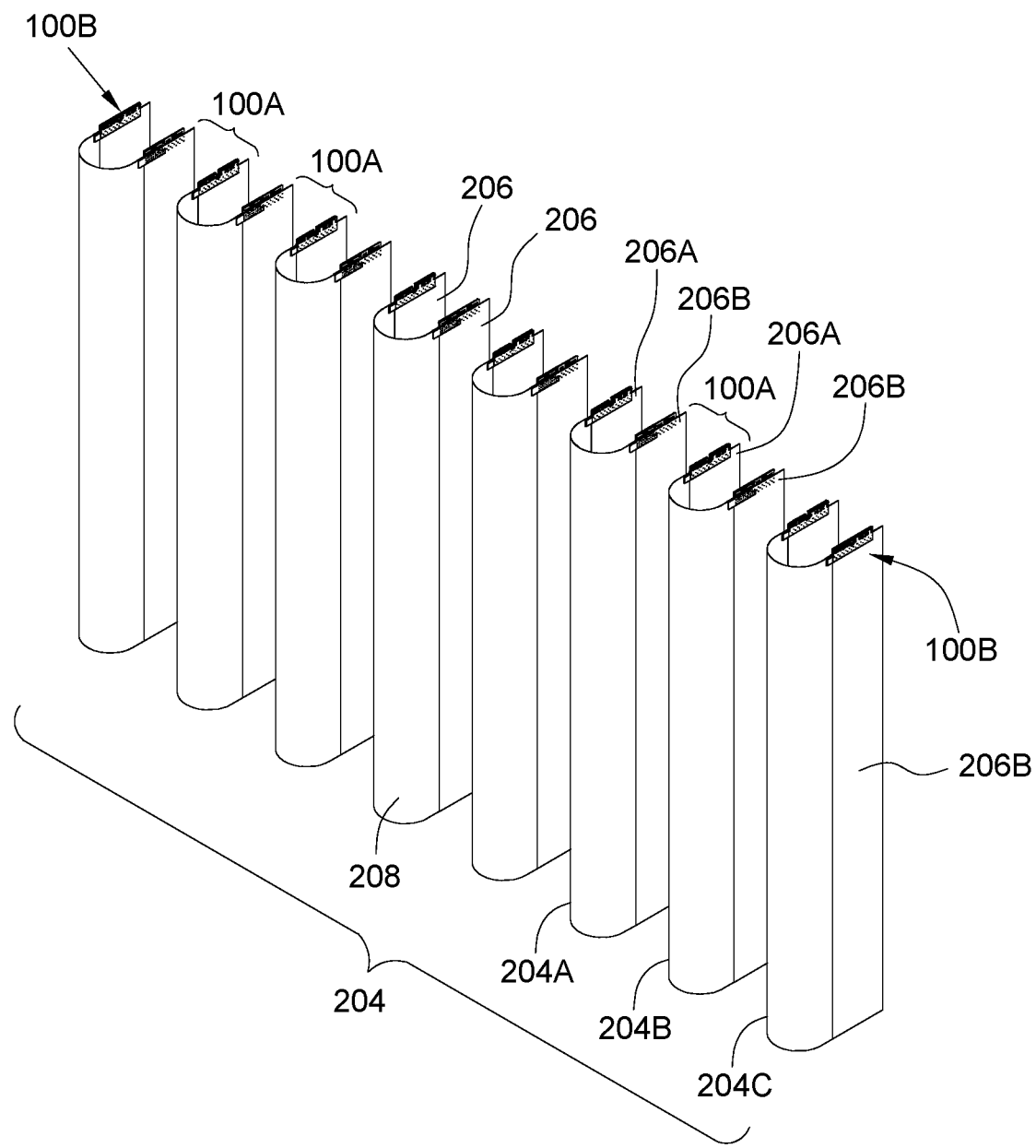
FIG. 21 is an exploded view illustrating the use of the fastening system for attaching the vertical panels.
Figure 22:
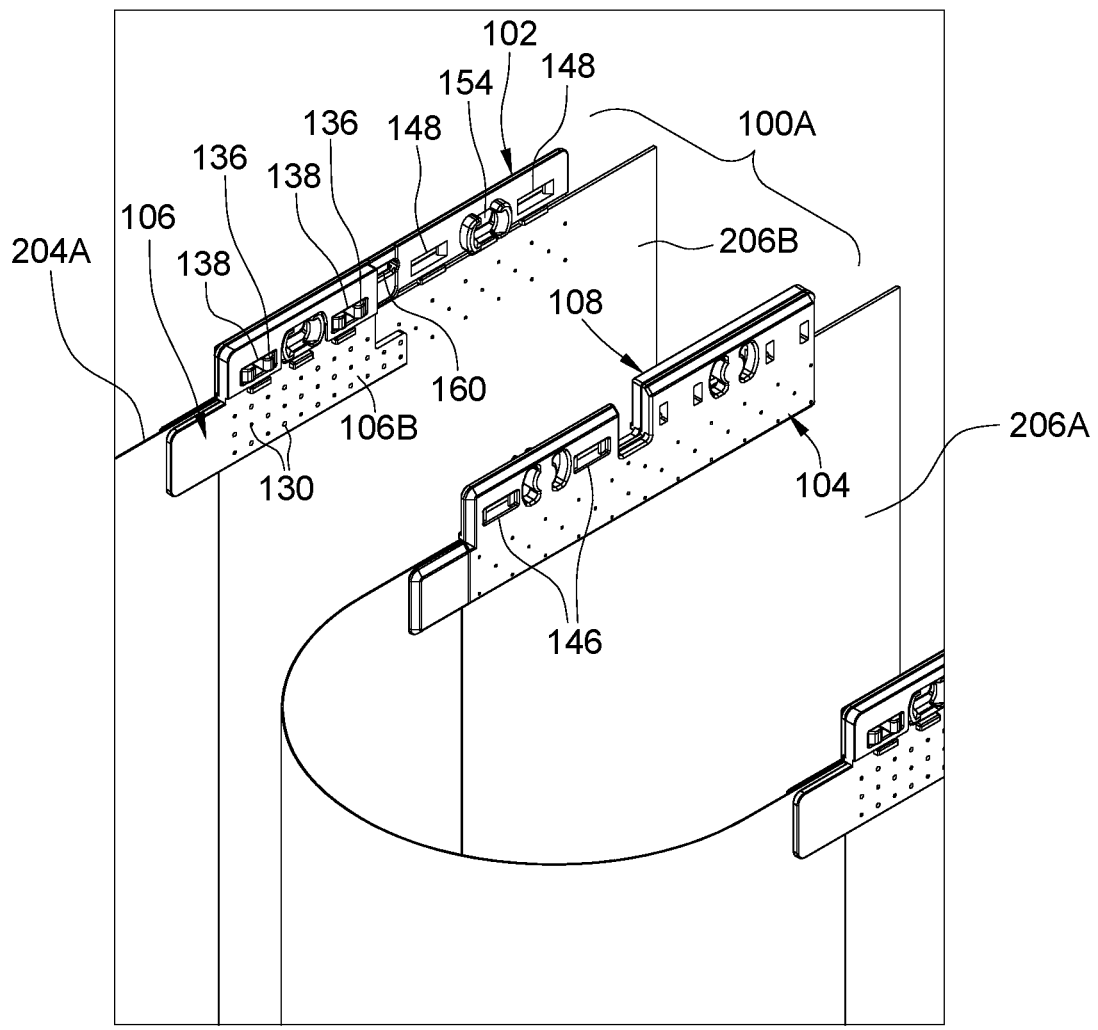
FIG. 22 is an enlarged perspective view illustrating how the fastening system is assembled for attaching adjacent vertical panels.
Figure 23:
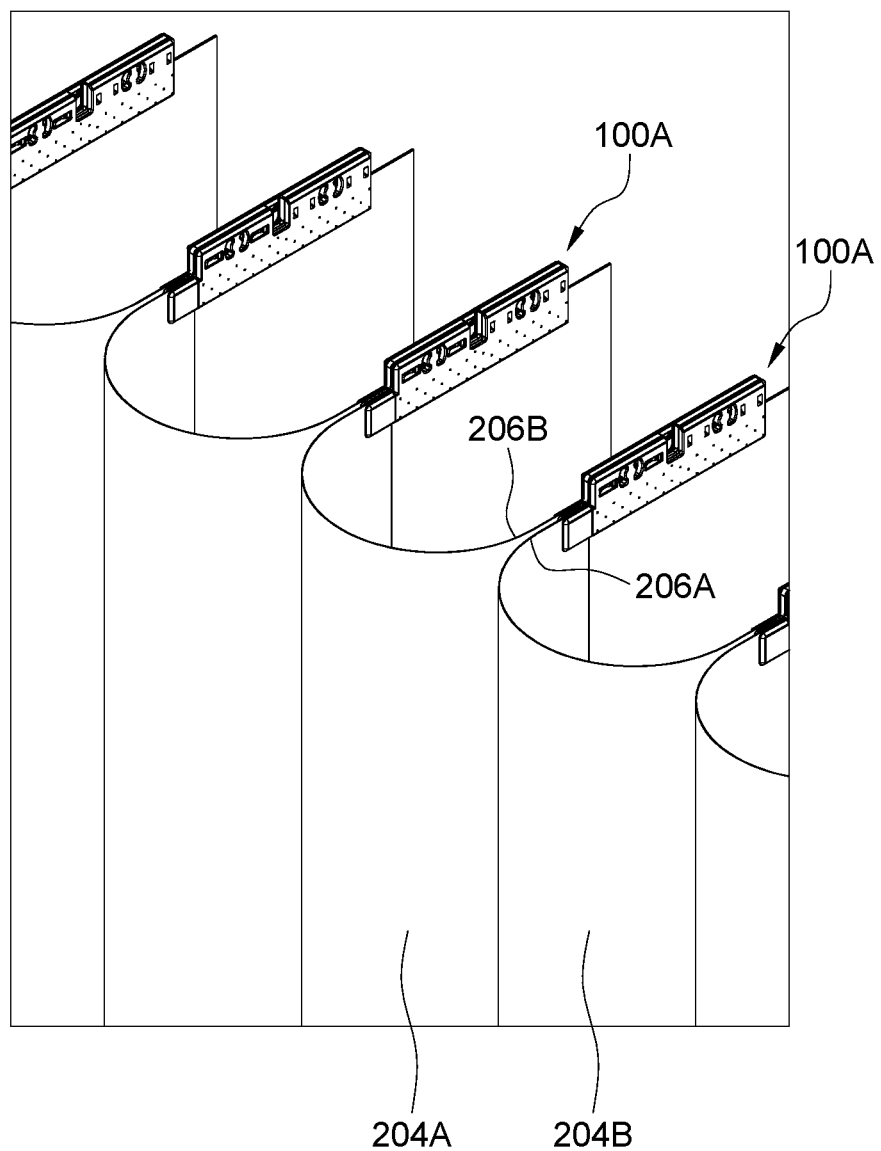
FIG. 23 is an enlarged perspective view illustrating adjacent vertical panels attached to one another with the fastening system.
Figure 24:
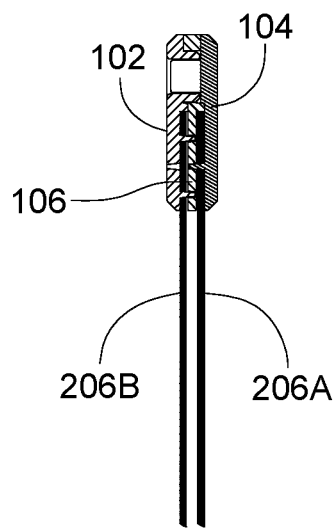
FIG. 24 is a cross-sectional view illustrating two adjacent vertical panels attached to each other with the fastening system.
Figure 25:
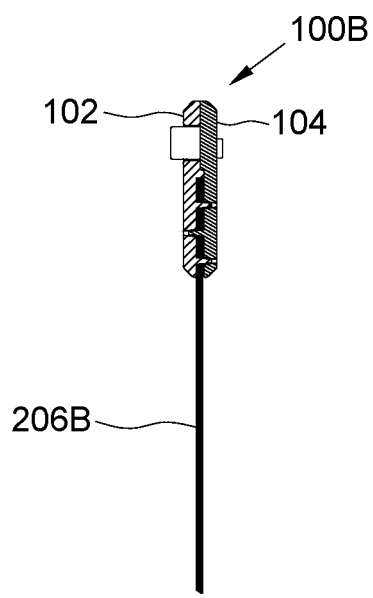
FIG. 25 is a cross-sectional view illustrating an outer side portion of an outmost vertical panel attached to the fastening system in the second configuration thereof.

Referring to FIGS. 8, 9 and 13, the clipping base 104 can further include one or more latch 150 that can engage with the clipping base 102 for attaching the clipping base 102 to the clipping base 104 with the two clipping plates 106 and 108 disposed between the two clipping bases 102 and 104. The latches 150 can serve for attaching the clipping base 102 to the clipping base 104 in the first configuration, and can remain disengaged from the clipping base 102 when the two clipping bases 102 and 104 are attached to each other in the second configuration. In the illustrated embodiment, two latches 150 are exemplary provided on the clipping base 104. It will be appreciated, however, that any number of the latches 150 may be provided for suitably attaching the clipping base 102 to the clipping base 104.

The two latches 150 may be respectively disposed above the two base regions 122 and 124 of the clipping base 104. According to an example of construction, each latch 150 can include resilient hooks 152 that protrude from the side of the inner surface 104A of the clipping base 104. According to an example of construction, the latches 150 can be formed integrally with the clipping base 104. According another example of construction, the latches 150 may be attached to the clipping base 104 via fasteners. Each latch 150 can protrude from the side of the inner surface 104A of the clipping base 104 with a length L3, which can correspond to a length of the resilient hooks 152. The length L3 of each latch 150 can be greater than the length L1 of each latch 134 and greater than the length L2 of each latch 140. The latches 150 can engage with the clipping base 102 through respective openings 154 provided on the clipping base 102. For example, the resilient hooks 152 of each latch 150 can engage with a boundary edge of the corresponding opening 154 for attaching the clipping base 102 to the clipping base 104. The two openings 154 can be respectively disposed above the base regions 112 and 114 of the clipping base 102.

Referring to FIG. 1, the clipping base 102 can further include an opening 160 for engagement of a hanger (not shown) provided on a head frame of a window shade. The opening 160 can be exemplary located above and adjacent to a connecting area between the two base regions 112 and 114 of the clipping base 102. Although the illustrated embodiment exemplary places the opening 160 on the clipping base 102, it will be appreciated that any one of the clipping bases 102 and 104 and the clipping plates 106 and 108 can include a similar opening for engagement of the hanger.

In conjunction with FIGS. 1-19, FIGS. 20-25 are schematic views illustrating exemplary use of the fastening system 100 in a window shade 200. Referring to FIGS. 20-25, the window shade 200 can include a head frame 202 and a plurality of vertical panels 204. The head frame 202 may be affixed at a top of a window frame, and may have an elongate shape.

Each vertical panel 204 can be made of a flexible material including, but not limited to, a fabric material, a web material, a mesh materials, and the like. Each vertical panel 204 can include two side portions 206, and a central portion 208 between the two side portions 206. According to an embodiment, the two side portions 206 and the central portion 208 may have different light transmissivities. For example, the light transmissivity of the central portion 208 may be higher than that of each side portion 206. Each vertical panel 204 can have generally U-shape when it is connected with the head frame 202.

Referring to FIGS. 21-25, multiple fastening systems 100 as described previously can be used to attach the vertical panels 204 adjacently to one another and to hang the vertical panels 204 below the head frame 202. More specifically, the fastening systems 100 can include fastening systems 100A in the first configuration described previously (i.e., respectively having the two clipping bases 102 and 104 attached to each other with the two clipping plates 106 and 108 disposed between the two clipping bases 102 and 104), and fastening systems 100B in the second configuration described previously (i.e., respectively having the two clipping bases 102 and 104 attached to each other without the two clipping plates 106 and 108 between the two clipping bases 102 and 104). The fastening systems 100A and 100B can be respectively connected with the head frame 202 for hanging the vertical panels 204. For example, the head frame 202 can include a plurality of hangers (not shown) that can respectively engage with the openings 160 of the fastening systems 100A and 100B.

Referring to FIGS. 1-19 and 21-24, each fastening system 100A can be applied for coupling two adjacent vertical panels 204 to each other with a top of one of the two adjacent vertical panels 204 held between the clipping base 102 and the two clipping plates 106 and 108 and a top of the other one of the two adjacent vertical panels 204 held between the clipping base 104 and the two clipping plates 106 and 108. For example, the vertical panels 204 can include two vertical panels 204A and 204B adjacent to each other, and the fastening system 100A can be disposed adjacent to one side portion 206B of the vertical panel 204A and to one side portion 206A of the other vertical panel 204B.

For assembling the fastening system 100A, the side portion 206B of the vertical panel 204A can be initially held between the clipping base 102 and the clipping plate 106 of the fastening system 100A, which are attached to each other by respectively engaging the latches 134 of the clipping base 102 through the openings 138 of the clipping plate 106 as described previously. The teeth 116 protruding from the clipping base 102 can pierce the side portion 206B at the top of the vertical panel 204A with the teeth 116 in the base region 112 of the clipping base 102 received partially in the corresponding holes 130 on the clipping plate 106, which can thereby hold the side portion 206B between the clipping base 102 and the clipping plate 106.

The side portion 206A of the other vertical panel 204B can be initially held between the clipping base 104 and the clipping plate 108 of the fastening system 100A, which are attached to each other by respectively engaging the latches 140 of the clipping base 104 through the openings 144 of the clipping plate 108 as described previously. The teeth 126 protruding from the clipping base 104 can pierce the side portion 206A at the top of the vertical panel 204B with the teeth 126 in the base region 124 of the clipping base 104 received partially in the corresponding holes 132 on the clipping plate 108, which can thereby hold the side portion 206A between the clipping base 104 and the clipping plate 108.

The side portion 206B of the vertical panel 204A and the side portion 206A of the vertical panel 204B then can be attached to each other by respectively engaging the latches 150 of the clipping base 104 through the openings 154 of the clipping base 102 as described previously. The two clipping bases 102 and 104 are thereby attached to each other with the clipping plate 106 positioned between the base region 112 of the clipping base 102 and the base region 122 of the clipping base 104, and the clipping plate 108 positioned between the base region 114 of the clipping base 102 and the base region 124 of the clipping base 104. In particular, the surface 106A of the clipping plate 106 can be oriented toward the base region 112 of the clipping base 102 and contact with the side portion 206B of the vertical panel 204A, and the other surface 106B of the clipping plate 106 can be oriented toward the base region 122 of the clipping base 104 and contact with the side portion 206A of the adjacent vertical panel 204B. Likewise, the surface 108A of the clipping plate 108 can be oriented toward the base region 124 of the clipping base 104 and contact with the side portion 206A of the vertical panel 204B, and the other surface 108B of the clipping plate 108 can be oriented toward the base region 114 of the clipping base 102 and contact with the side portion 206B of the adjacent vertical panel 204A.

Referring again to FIGS. 20, 21 and 25, the vertical panels 204 can further include an outmost vertical panel 204C having an outer side portion 206B not attached to any other vertical panel. The fastening system 100B can be used for connection with the outer side portion 206B of the outmost vertical panel 204C, the top of the outer side portion 206B being held between the two clipping bases 102 and 104 of the fastening system 100B that are attached to each other without the clipping plates 106 and 108 between the two clipping bases 102 and 104. More specifically, as previously described with reference to FIGS. 1-19, the two clipping bases 102 and 104 can be attached to each other by respectively engaging the latches 134 of the clipping base 102 through the openings 146 of the clipping base 104 and by respectively engaging the latches 140 of the clipping base 104 through the openings 148 of the clipping base 102. The teeth 116 protruding from the clipping base 102 can pierce the outer side portion 206B of the outmost vertical panel 204C and can be received partially in the corresponding holes 128 on the clipping base 104, and the teeth 126 protruding from the clipping base 104 can pierce the outer side portion 206B of the outmost vertical panel 204C and can be received partially in the corresponding holes 118 on the clipping base 102, which can thereby hold the outer side portion 206B between the clipping bases 102 and 104.

The fastening system described herein is relatively simple in construction, and can be used to conveniently attach vertical panels of a window shade. The fastening system has multiple configurations that allow attachments of adjacent vertical panels as well as outer side portions of outmost vertical panels.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. A fastening system for a window shade, comprising:
   a first clipping base and a second clipping base, the first clipping base having a first and a second base region, and the second clipping base having a third and a fourth base region; and
   a first and a second clipping plate respectively positionable between the first clipping base and the second clipping base, the first clipping plate having a first and a second surface opposite to each other, and the second clipping plate having a third and a fourth surface opposite to each other;
   wherein the fastening system has a first configuration where the first and second clipping bases are attached to each other with the first clipping plate positioned between the first base region and the third base region and the second clipping plate positioned between the second base region and the fourth base region, and a second configuration where the first and second clipping bases are attached to each other without the first and second clipping plates between the first and second clipping bases, the fastening system in the first configuration being adapted to hold a first panel of a window shade between the first clipping base and the first and second clipping plates and to hold a second panel of a window shade between the second clipping base and the first and second clipping plates, and the fastening system in the second configuration being adapted to hold a single panel of a window shade between the first clipping base and the second clipping base;
   wherein the first clipping plate is positionable between the first clipping base and the second clipping base with the first surface oriented toward the first base region for contacting with the first panel and the second surface oriented toward the third base region for contacting with the second panel, and the second clipping plate is positionable between the first clipping base and the second clipping base with the third surface oriented toward the second base region for contacting with the first panel and the fourth surface oriented toward the fourth base region for contacting with the second panel.

2. The fastening system according to claim 1, wherein the first clipping plate is attachable to the first clipping base independently of the second clipping plate and the second clipping base, and the second clipping plate is attachable to the second clipping base independently of the first clipping plate and the first clipping base.

3. The fastening system according to claim 2, wherein the first clipping base has a first latch engageable with the first clipping plate for attaching the first clipping plate to the first clipping base, and the second clipping base has a second latch engageable with the second clipping plate for attaching the second clipping plate to the second clipping base.

4. The fastening system according to claim 3, wherein the first latch is further engageable with the second clipping base for attaching the second clipping base to the first clipping base without the first and second clipping plates between the first and second clipping bases.

5. The fastening system according to claim 4, wherein the second clipping base further has a third latch engageable with the first clipping base for attaching the first clipping base to the second clipping base with the first and second clipping plates disposed between the first and second clipping bases.

6. The fastening system according to claim 2, wherein the first clipping base has a first latch, and the second clipping base has a second and a third latch, the second and third latches respectively protruding from the second clipping base with different lengths, the first latch being selectively engageable with the first clipping plate in the first configuration or the second clipping base in the second configuration, the second latch being selectively engageable with the second clipping plate in the first configuration or the first clipping base in the second configuration, and the third latch being engageable with the first clipping base in the first configuration.

7. The fastening system according to claim 6, wherein one or more of the first, second and third latches include resilient hooks.

8. The fastening system according to claim 1, wherein the first and second clipping plates have a substantially equal thickness.

9. The fastening system according to claim 1, wherein each of the first and second clipping plates has a surface area smaller than that of the first clipping base.

10. The fastening system according to claim 1, wherein the first and second base regions are provided on a same side of the first clipping base, the third and fourth base regions are provided on a same side of the second clipping base, the first base region facing the third base region and the second base region facing the fourth base region in the first and second configurations.

11. The fastening system according to claim 1, wherein the first clipping base includes a plurality of first teeth adapted to pierce a panel of a window shade that are distributed across and protrude from the first and second base regions, the second clipping base includes a plurality of second teeth adapted to pierce a panel of a window shade that are distributed across and protrude from the third and fourth base regions, the first clipping plate includes a plurality of first holes adapted to at least partially receive a portion of the first teeth protruding from the first base region and a portion of the second teeth protruding from the third base region, and the second clipping plate includes a plurality of second holes adapted to at least partially receive a portion of the first teeth protruding from the second base region and a portion of the second teeth protruding from the fourth base region.

12. The fastening system according to claim 11, wherein the first clipping base further includes a plurality of third holes adapted to respectively receive at least partially the second teeth of the second clipping base, and the second clipping base further includes a plurality of fourth holes adapted to respectively receive at least partially the first teeth of the first clipping base.

13. The fastening system according to claim 1, wherein the first clipping base further includes an opening for engagement of a hanger, the opening being located adjacent to a connecting area between the first and second base regions.

14. A window shade comprising:
a first vertical panel, a second vertical panel and an outmost vertical panel; and
the fastening system according to claim 1, the fastening system being configurable to couple the first vertical panel adjacently to the second vertical panel, or to connect with an outer side portion of the outmost vertical panel;
wherein the first configuration of the fastening system is applicable for coupling the first vertical panel adjacently to the second vertical panel with a top of the first vertical panel held between the first clipping base and the first and second clipping plates and a top of the second vertical panel held between the second clipping base and the first and second clipping plates, and the second configuration of the fastening system is applicable for connecting with the outer side portion of the outmost vertical panel with a top of the outer side portion held between the first clipping base and the second clipping base.

15. The window shade according to claim 14, wherein each of the first and second vertical panels respectively includes two side portions and a central portion between the two side portions, the fastening system being disposed adjacent to one side portion of the first vertical panel and one side portion of the second vertical panel.

16. The window shade according to claim 15, wherein the central portion and each of the two side portions on each of the first and second vertical panels have different light transmissivities.

17. The window shade according to claim 14, further including a head frame, the fastening system being connected with the head frame.

18. A fastening system for a window shade, comprising:
a first clipping base and a second clipping base; and
a first and a second clipping plate respectively positionable between the first clipping base and the second clipping base;
wherein the fastening system has a first configuration where the first and second clipping bases are attached to each other with each of the first and second clipping plates respectively disposed between and respectively in contact with the first and second clipping bases, and a second configuration where the first and second clipping bases are attached to each other without the first and second clipping plates between the first and second clipping bases, the fastening system in the first configuration being adapted to hold a first panel of a window shade between the first clipping base and the first and second clipping plates and to hold a second panel of a window shade between the second clipping base and the first and second clipping plates, and the fastening system in the second configuration being adapted to hold a single panel of a window shade between the first clipping base and the second clipping base;
wherein the first clipping plate is attachable to the first clipping base independently of the second clipping plate and the second clipping base, and the second clipping plate is attachable to the second clipping base independently of the first clipping plate and the first clipping base, the first clipping base having a first latch, and the second clipping base having a second and a third latch, the second and third latches respectively protruding from the second clipping base with different lengths, the first latch being selectively engageable with the first clipping plate in the first configuration or the second clipping base in the second configuration, the second latch being selectively engageable with the second clipping plate in the first configuration or the first clipping base in the second configuration, and the third latch being engageable with the first clipping base in the first configuration.

19. The fastening system according to claim 18, wherein one or more of the first, second and third latches include resilient hooks.

* * * * *